(12) United States Patent
Dye et al.

(10) Patent No.: US 11,098,852 B1
(45) Date of Patent: Aug. 24, 2021

(54) VAPOR COOLED INSULATION STRUCTURE

(71) Applicant: Quest Thermal Group LLC, Arvada, CO (US)

(72) Inventors: Scott A. Dye, Morrison, CO (US); Alan B. Kopelove, Evergreen, CO (US); Phillip N. Tyler, Westminster, CO (US)

(73) Assignee: Quest Thermal Group LLC, Arvada, CO (US)

( * ) Notice: Subject to any disclaimer, the term of this patent is extended or adjusted under 35 U.S.C. 154(b) by 90 days.

(21) Appl. No.: 16/015,860

(22) Filed: Jun. 22, 2018

Related U.S. Application Data

(60) Provisional application No. 62/525,568, filed on Jun. 27, 2017.

(51) Int. Cl.
*F17C 3/10* (2006.01)
*B32B 3/10* (2006.01)
*F17C 13/00* (2006.01)

(52) U.S. Cl.
CPC ............... *F17C 3/10* (2013.01); *B32B 3/10* (2013.01); *F17C 13/001* (2013.01); *F17C 13/008* (2013.01); *B32B 2307/304* (2013.01); *B32B 2307/7242* (2013.01); *B32B 2439/00* (2013.01); *F17C 2201/0109* (2013.01); *F17C 2203/0375* (2013.01); *F17C 2270/0194* (2013.01)

(58) Field of Classification Search
CPC ........ F17C 3/10; F17C 13/008; F17C 13/001; F17C 2270/0194; B32B 2307/7242; B32B 3/10
See application file for complete search history.

(56) References Cited

U.S. PATENT DOCUMENTS

| | | | | |
|---|---|---|---|---|
| 2,179,057 A * | 11/1939 | Schuetz | ............... | E04B 1/78 138/111 |
| 3,981,689 A * | 9/1976 | Trelease | ............... | F16L 59/06 52/244 |
| 4,054,158 A * | 10/1977 | Hoeman | ............... | F16L 59/07 138/155 |
| 4,659,601 A * | 4/1987 | Elliott | ............... | F16L 59/08 428/591 |
| 5,956,957 A * | 9/1999 | Lowry | ............... | F17C 3/085 62/48.3 |
| 6,786,241 B2 * | 9/2004 | Bedner | ............... | F16L 59/07 138/121 |
| 2016/0033083 A1 * | 2/2016 | Leachman | ............... | F17C 3/10 220/560.14 |

* cited by examiner

*Primary Examiner* — Ana M Vazquez
(74) *Attorney, Agent, or Firm* — Polsinelli PC

(57) ABSTRACT

A vapor cooled insulation structure includes at least one vapor sealed layer, created with discrete spacers between two layers. A vapor transport layer is created within these layers through which a cold fluid may flow to intercept and remove heat from an underlying structure. In one example, the vapor cooled system carries cold vapor which is in direct contact with an underlying cryogenic tank structural support.

20 Claims, 7 Drawing Sheets

VAPOR COOLED INSULATION STRUCTURE

CROSS-REFERENCE TO RELATED APPLICATION

This application is related to and claims priority under 35 U.S.C. § 119(e) from U.S. Patent Application No. 62/525,568, filed Jun. 27, 2017, entitled "Vapor Cooled Insulation Structure," the entire contents of which are hereby incorporated by reference for all purposes.

FIELD

The present disclosure relates to vapor cooling of structures for tanks, tank supports, or other equipment. In one particular example, the present disclosure involves a thermal insulation structure able to use vapor cooling to insulate and reduce heat leak into cryogenic tanks, tank support elements, or equipment such as superconducting devices, appliances or refrigerated containers.

BACKGROUND

Improvements in cryogenic propellant storage and transfer are a critical need for future NASA and commercial space missions, with zero boil off of cryogenic propellant being one important goal, among others. Zero boil-off generally refers to an operational state in which the cryogenic propellant is maintained in a substantially liquid state such that vaporization of the cryogenic propellant is significantly reduced or eliminated. Human exploration requires advances in propulsion for transport to Earth orbit, the moon, Mars and beyond. Cryogenic propellants have the highest energy density of any chemical rocket fuel and are used to power the ascent of most NASA and commercial launch vehicles. Cryogenic propellants must be kept cold to preserve them and prevent loss via boil off. As a result, cryogenic launch vehicles must have thermal insulation protecting the cryopropellant.

Lowering the cost and improving the reliability of space access will provide significant benefits to civil space (human and robotic exploration beyond Earth as well as Earth science), to commercial industry, to educational institutions, and to national security and will increase support for various space-related projects and institutions, such as the International Space Station National Laboratory. However, significant challenges exist for such space access. Zero boil off storage of cryogenic propellants for long duration missions, for example, is NASA's #2 ranked technical challenge for future NASA missions and new technologies are necessary for improved cryogenic propellant storage and transfer to support NASA's exploration goals. In response, there have been advances in tank insulation, such as Integrated Multilayer Insulation and Load Bearing Multilayer Insulation, which reduce heat leak into the cryogen in a storage tank. The heat leak through tank supports such as struts and skirts, however, remains an increasingly large part of the total heat flow into modern, well insulated tanks. In light of this issue, NASA has a high priority for simple mass-efficient insulation and cooling techniques for tank structural skirts (such as those formed of aluminum, stainless steel, or composite materials) and, in particular, for structural skirts of large upper stage tanks containing liquid hydrogen and liquid methane. Improved cryogenic insulation that can incorporate vapor cooling to reduce the heat flux through struts and skirts would benefit overall cryogenic fluid management, and help towards achieving zero boil off.

SUMMARY

In one aspect of the present invention, a vapor cooled insulation structure (also referred to herein as a Vapor Cooled Structure or "VCS") is provided that includes a sealed vapor transport layer. The vapor transport layer includes a vapor non-permeable top surface and a plurality of discrete spacers separating the top surface from a bottom surface. The bottom surface may be a vapor tight barrier or may be the surface of the structure to be cooled, such as a tank support element or an equipment surface or wall.

The discrete spacers create a vapor transport layer, through which cold vapor, such as a cryogen boiling off from a cryogen tank or vapor actively cooled by a cryocooler or refrigeration system, can flow. As a result, the cold vapor is maintained in thermal contact with the entirety of the support element or surface to be cooled. This provides for much higher efficiency heat interception and removal. In certain implementations, 80 to 90% of heat can be removed through support elements.

In an aspect, the top surface of the VCS is made of a low emissivity material, such that the vapor transport layer itself reduces heat flux through the underlying surface or element, and acts as an insulation system by itself.

In another aspect, the VCS is created from one layer of a multilayer insulation system and encompassed within the multilayer insulation. In certain implementations, the vapor transport layer may be at the bottom of the multilayer structure, in direct contact with the surface to be cooled to intercept heat being conducted through the support element via solid conduction. In other implementations, the vapor transport layer may be located in the midst of a multilayer insulation system to intercept heat leak coming through the insulation.

In another aspect, a sealed vapor layer is created using a top and bottom surface, with one or both surfaces having embossed features or dimples to create spacers and form the vapor transport layer.

In an additional aspect, the VCS could be part of a closed loop to circulate cold fluid or refrigerated fluid, with the vapor layer in thermal contact with the surface or structure to be cooled, thereby providing excellent thermal contact and ability to intercept heat from reaching the structure surface.

In addition to the exemplary aspects and embodiments described above, further aspects and embodiments will become apparent by reference to the drawings and by study of the following descriptions.

BRIEF DESCRIPTION OF THE FIGURES

The foregoing and other objects, features, and advantages of the present disclosure set forth herein should be apparent from the following description of particular embodiments of those inventive concepts, as illustrated in the accompanying drawings. The drawings depict only typical embodiments of the present disclosure and, therefore, are not to be considered limiting in scope.

DETAILED DESCRIPTION

Figure 1:
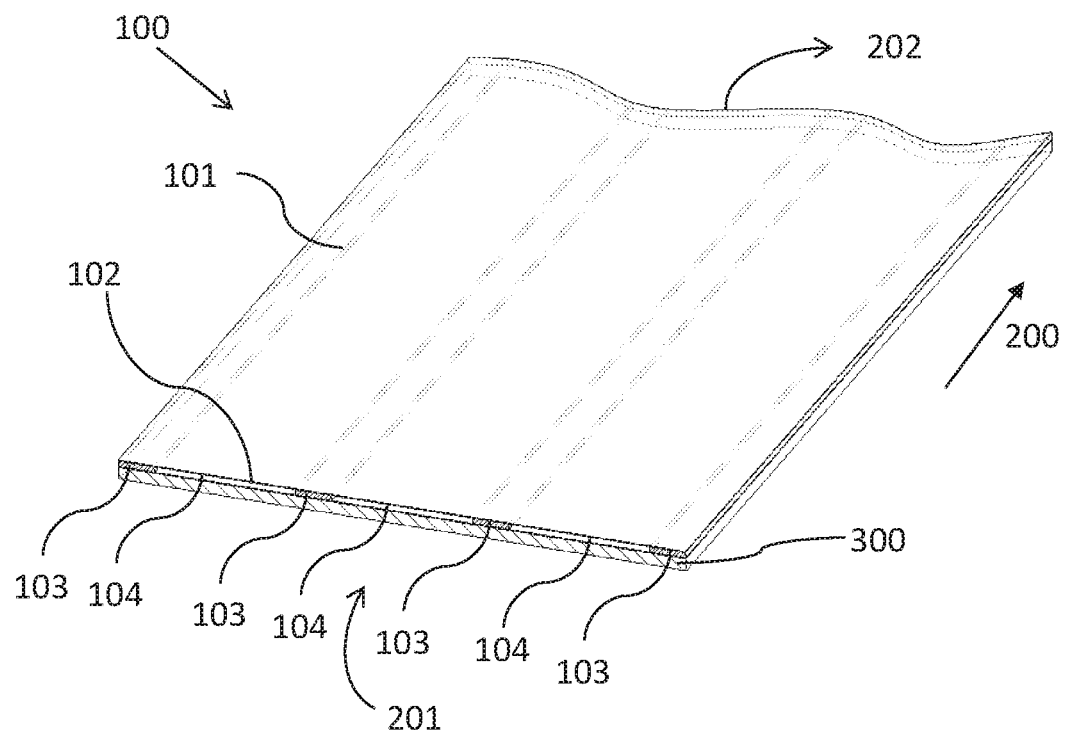
FIG. 1 illustrates a transparent partial isometric view of a Vapor Cooled Insulation Structure (also referred to herein as a Vapor Cooled Structure or "VCS") according to a first embodiment of the present disclosure wherein the VCS is attached to a support structure.

The following embodiments and aspects thereof are described and illustrated in conjunction with systems, tools, materials and methods which are meant to be exemplary and illustrative, not limiting in scope. In various embodiments, one or more of the above-described problems have been reduced or eliminated, among others, while other embodiments are directed to additional improvements.

Vapor cooling refers generally to a method of cooling a surface in which a cold vapor is used to carry undesired heat away from the surface and typically includes an insulating structure applied to the surface through which the cold vapor is permitted to flow. In certain applications, for example, a vapor-cooled insulation may be applied to a surface of a tank or other storage vessel used to contain cryogenic fluids, such as cryogenic propellants. Vapor-cooled insulation may also be applied to structural elements used to support such vessels to prevent heat from transferring between the structural elements and the tank.

In some implementations, the vapor-cooled structure may include cooling tubes that carry the cold vapor that makes thermal contact with a thermal shield. As heat is transferred toward the structure or surface being cooled and to which the vapor-cooled structure is applied, the thermal shield (which is also known as a broad area cooled shield) intercepts the heat. The heat is then conducted along the thermal shield to the cooling tubes and absorbed and carried off by the cold vapor contained within the cooling tubes, significantly reducing the amount of heat transferred to the surface. In applications in which the surface corresponds to a vessel or tank, the reduction in heat transferred to the surface translates to a significant reduction of heat transferred to the contents of the tank/vessel (e.g., a cryogenic propellant). Accordingly, vapor cooling has improved the thermal performance of tank insulation and has been incorporated into high performance cryogenic storage tanks, such as those used on the Space Shuttle and on cryogenic space instruments.

The current state of the art for vapor cooling of tank supports requires heavy cooling tubes to carry cold vapor and make thermal contact with a heavy thermal cooled shield. Vapor cooling systems, such as tube-on-shield systems (where cooling tubes must make extensive thermal contact with a metallic shield around the support element) or tube-on-skirt methods (where cooling tubes must make extensive direct thermal contact with a tank support skirt surface), can be used to intercept heat flux through the supports. These systems, which are often used with closed vapor loops using active cooling via a cryocooler, have a substantial mass penalty. Moreover, these and other vapor cooling methods currently available or in development must use separate, additional components such as stainless steel tubing to carry the vapor and to conduct heat to the vapor.

Current vapor cooled systems for tank supports also suffer from low efficiency of intercepted heat. For example, many conventional systems intercept as low as 20% of the heat conducted through the tank support into the tank and contents. Moreover, none of the tube-on-shield type vapor cooling methods can directly provide insulation along with vapor cooling. Current vapor cooling methods also cannot provide high efficiency, direct, full coverage of the surface to be cooled with the cold vapor (or with a cold liquid as the cooling fluid).

To address the foregoing issues, among others, vapor cooling systems according to the present disclosure eliminate the tubing systems of conventional vapor cooling systems, relying instead on channels defined within a hermetically sealed insulation layer to facilitate circulation of the cold vapor. In general, and as described below in more detail, the vapor cooling system of the present disclosure includes a face sheet that is offset from a second face sheet or the surface being cooled by a series of support elements such that the face sheet, support elements, and second face sheet (or surface being cooled) form one or more hermetically sealed channels between the surface being cooled and the face sheet. Cold vapor is then circulated through the hermetically sealed channels to intercept and carry away heat that would otherwise be transferred to the surface.

By not relying on a tubing system for circulation of the cold vapor, the vapor cooling systems of the present disclosure provide notable weight savings as compared to conventional tubing-based systems. Moreover, the channels of the disclosed system increase surface area contact between the circulating cold vapor and the surface being cooled as compared to tube-based systems. Accordingly, due to both the reduction in weight and increased cooling capacity, vapor cooling systems in accordance with this disclosure exhibit significantly higher cooling efficiency as compared to conventional designs.

For example, many conventional vapor cooling systems intercept no more than 50% of heat flux and have areal masses that may be up to 2.1 kg/m$^2$ in some cases. In contrast, vapor cooled systems of the present disclosure have been demonstrated to intercept up to 90% of heat flux with an areal mass as low as 0.12 kg/m$^2$. If overall efficiency is evaluated based on Watts of heat removed per kg mass, current state of the art tube-on-shield methods generally exhibit an efficiency of 25-34 W/kg. In sharp contrast, implementations of the present disclosure have exhibited heat removal efficiencies as high as 990 W/kg.

Aspects of the present disclosure are directed to a vapor cooled insulation structure (also referred to herein as a Vapor Cooled Structure or "VCS") for application to a cryogenic or refrigerant tank or support structure. In certain implementations, the VCS 100 is attached to a cryogenic tank or refrigerated enclosure support element 300 as depicted in FIG. 1. The VCS 100, in one example, may include a hermetic base face sheet 102 and a hermetic top face sheet 101 separated by a series of discrete spacers 103. Interstitial spaces 104 are created between the face sheets 101, 102, and spacers 103 and provide a vapor transport layer through which cold gas or fluid 201 can flow (e.g., in a direction 200), intercepting thermal heat transfer from the support structure 300 to the tank. The cold gas could be from cryogenic boil-off or from a recirculated coolant loop, among other sources. As heat is intercepted, the gas vapor temperature rises and is expelled from downstream (as indicated by arrow 202). In the arrangement shown where the VCS 100 covers the entire surface of the support structure 300, the entire surface of the support structure 300 is cooled by the gas flow. Other arrangements may include more or less interaction between the VCS 100 and structure 300 that the VCS 100 is intended to cool.

Figure 2:
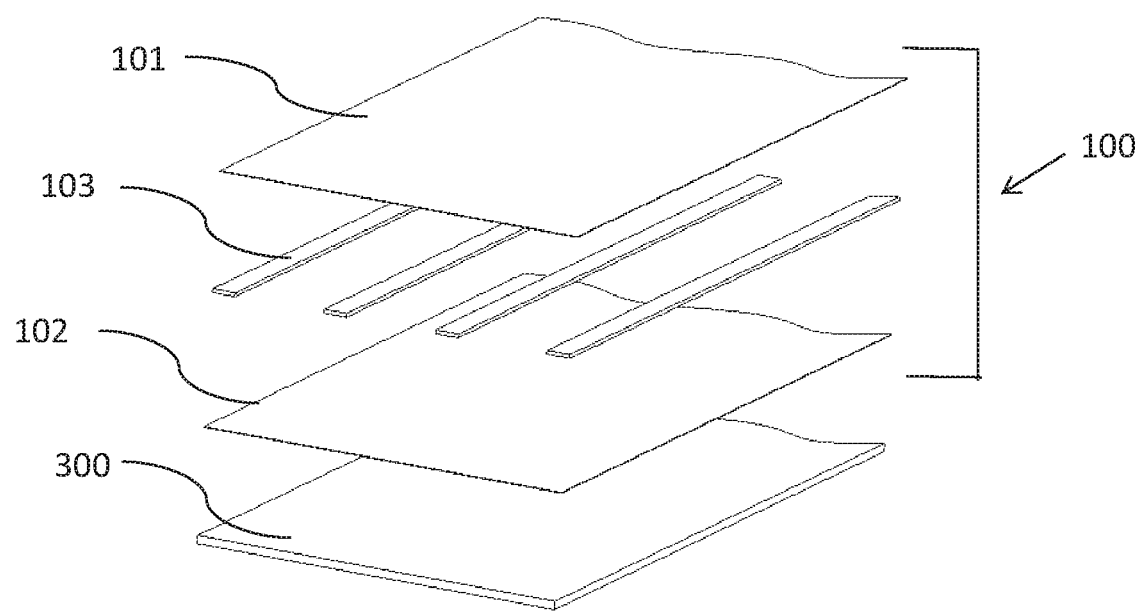
FIG. 2 illustrates an exploded view showing components of the VCS of FIG. 1.

As illustrated in the exploded view of FIG. 2, the VCS 100 includes a hermetic bottom face sheet 102, which in various possible examples may be a metalized polymer film or films, a composite or metal foil, or combinations of the same. Discrete spacers 103 may be adhered to the bottom face sheet 102 in some manner such as through bonding, welding or heat staking. The spacers 103 may, in certain implementations, be formed of metal, polymer or ceramic type materials. A hermetic top face sheet 101, which in various possible examples may be a metalized polymer film or films, a composite or a metal foil, or combinations thereof, is adhered to the spacers 103 in some manner such as through bonding, welding or heat staking.

In certain implementations, the bottom face sheet 102 may be omitted and the spacers 103 may instead extend directly from the structure 300. For example, in certain implementations, the spacers 103 may be formed separately and then coupled to the support structure or tank surface 300, such as by welding. In other implementations, the spacers 103 may instead be integrally formed with the surface 300. For example, a series of grooves or channels may be formed or machined into the surface 300 such that the spacers 103 take the form of walls separating adjacent grooves or channels. In either case, the hermetic top face sheet 101 may be adhered to the spacers 103 such that the interstitial spaces 104 are defined between the surface 300, the spacers 103, and the top face sheet 101.

Figure 3:
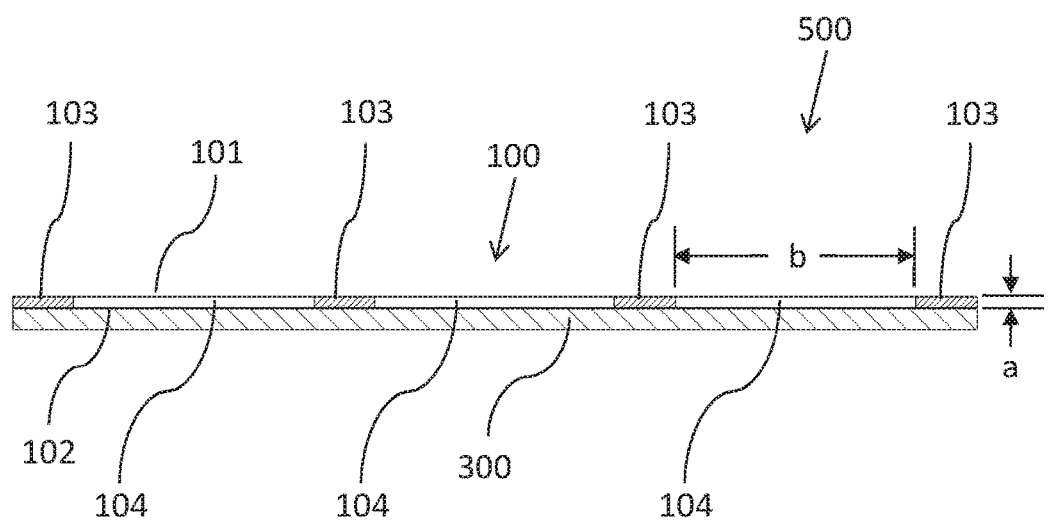
FIG. 3 illustrates a sectional view of the VCS of FIG. 1.

As depicted in the cross section of FIG. 3, the vapor transport layer of the VCS 100 includes the optional bottom face sheet 102, the discrete spacers 103 and the top face sheet 101 and, once assembled, provides the interstitial spaces 104 between the face sheets 101, 102 and the spacers 103 that are required for cooled vapor or fluid to freely flow through the VCS 100. More particularly, in the example shown, the spacers 103 are elongate rectangular lengths of material of a height defining the interstitial spacing between the top face sheet 101 and the bottom face sheet 102. The spacers 103 are laid out in parallel with reference to the long axis of the rectangles, and the spacing between the spacers 103 provides a flow path for the vapor between the spacers 103 and across the face sheets 101, 102. Vapor enters the interstitial spaces 104, flows across the surfaces of the face sheets 101, 102 (or directly across the surface being insulated (e.g., the tank or support structure 300)), and between the spacers 103, carrying away any heat in the interstitial spaces 104. The spacers 103, in this example, while shown as elongate rectangular structures with rectangular cross sections in the view provided, may be elongate structures with alternative cross sectional characteristics, including, without limitation, circular (e.g. an elongate solid or hollow tube), square, trapezoidal, and triangular cross sectional characteristics. Spacers 103 provide several functions to the VCS 100, including creating the interstitial spaces 104 for the vapor transport layer, controlling the height "a" of the vapor transport layer (which can be optimized for flow and pressure), providing structural support for the top face sheet 101, and providing vapor flow paths for good thermal contact between the vapor flowing through the VCS 100 and the support structure 300 (or other insulated structure). Spacer dimension "a" and lateral spacing "b" can be optimized for different VCS operating conditions, such as maximum pressure or mass reduction. Spacer height "a" may be in a range from and including 0.005 inches to and including 0.5 inches, for example. Spacing dimension "b" might range from and including 1 inch to and including 6 inches, depending on the required operating pressure, available gas flow, or other structural or functional requirements. The VCS 100 is attached by some means such as bonding, bolting, welding or heat staking to a tank surface or support structure 300 to intercept unwanted heat gain between the tank or support structure 300 and the surrounding environment 500 via radiative, conductive, or convective heat transfer. Namely, any heat transferred to or from the tank or support structure 300 is carried away by the vapor flowing through the interstitial spaces 104 of the VCS 100. The outer surface of the top face sheet 101 may also be treated to provide a low emissivity surface such that the VCS 100 also acts as an insulative radiation barrier.

Figure 4:
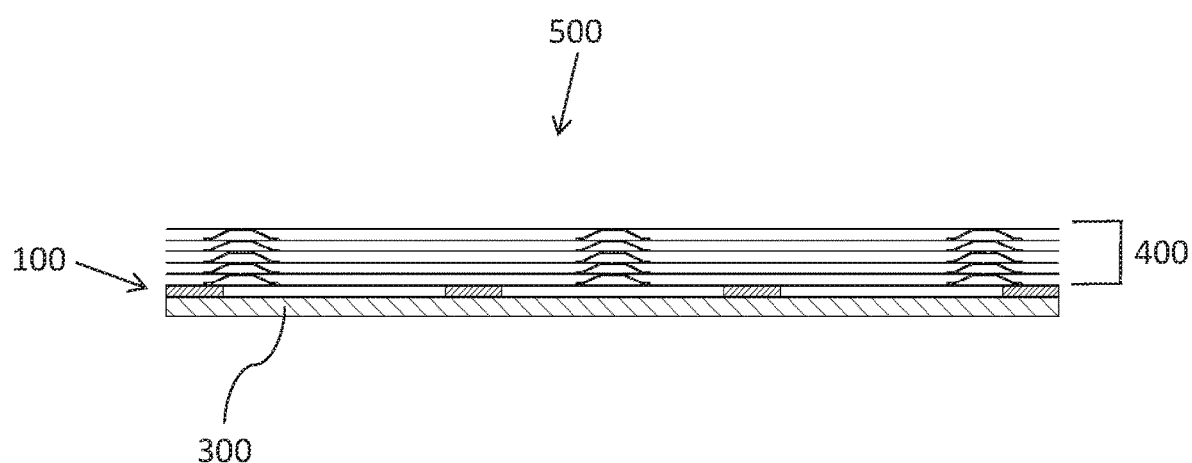
FIG. 4 illustrates a sectional view of the VCS of FIG. 1 supporting an external insulation structure.

In an alternative embodiment, and as depicted in the cross section view of FIG. 4, the VCS 100 attached to the tank or support structure surface 300 could be used to support an additional insulation member 400 such as multilayer insulation, foam, fiberglass, silica or vacuum insulated panels. As a result, the VCS 100 is further insulated from the surrounding environment 500. Insulating the VCS 100 from the surrounding environment 500 allows for higher heat rejection via the flow of cold vapor along and around the tank or support structure surface 300. Heat arriving at the top face sheet through the insulation is carried away from the structure 300 by the vapor flowing through the interstitial spaces of the VCS 100.

Figure 5:
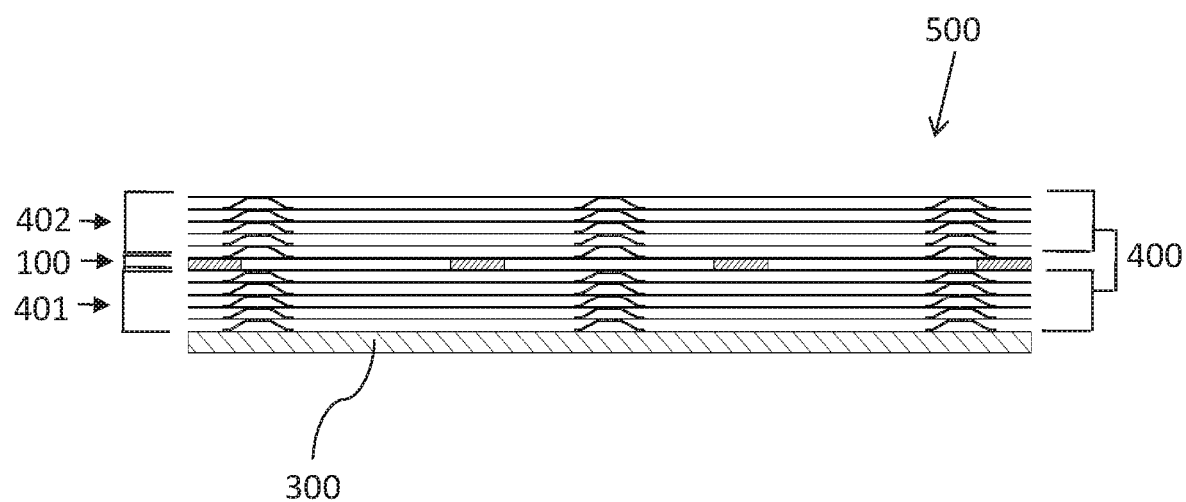
FIG. 5 illustrates a sectional view of the VCS of FIG. 1 contained within an insulation structure.

As another alternative embodiment, and as depicted in the cross-sectional view of FIG. 5, the VCS 100 could reside within an insulation structure 400. In other words, an interior insulation portion 401 of the insulation structure 400 may be disposed interior to the VCS 100 (i.e., the interior insulation portion 401 is disposed between the structure being insulated 300 and the VCS 100) while an exterior insulation portion 402 of the insulation structure 400 could be disposed exterior to the VCS 100 (i.e., the exterior insulation portion 402 is between the surrounding environment 500 and the VCS 100). In this example, the VCS 100 may include top and/or bottom face sheets with spacers therebetween, forming interstitial spaces through which a cooled vapor may flow. Alternatively, the top and bottom face sheets may be exterior and interior face sheets of the interior insulation portion 401 and the exterior insulation portion 402, respectively. In such an example, the spacers may be bonded directly to sheets of the interior and exterior insulation portions 401, 402, thereby forming a unified insulation structure with an internal vapor path. In the example illustrated, the interior and exterior insulation portions 401, 402 are each shown with five insulating layers. It is possible to have other numbers and arrangements of insulating layers for each of the interior and exterior insulation portions 401, 402. The insulation structure 400 could be of any form, including multilayer insulation, and may include, among other things, foam, fiberglass, silica, or vacuum insulated panels. The position of the VCS 100 can be determined by the temperature of the flowing gas such that there is an energy balance for little or no heat gain into or from the tank or support structure 300.

Figure 6:
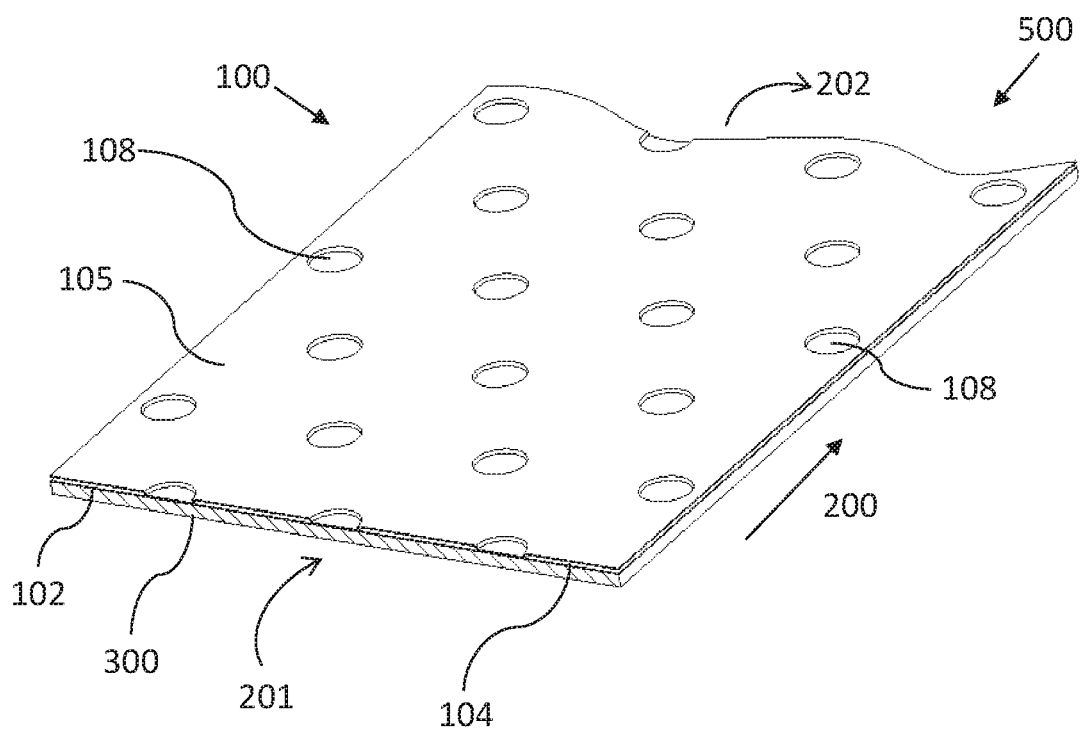
FIG. 6 illustrates a partial isometric view of a second embodiment of a VCS according to the present disclosure, the VCS including an embossed face sheet.

As an alternative to discrete spacers, FIG. 6 illustrates an embodiment in which a hermetic top face sheet 105 is embossed or dimpled to create a series of predefined dimples or offsets 108. The top sheet 105 may be formed from a lightweight material suitable for embossing such as metalized polymer films, composites, or metal foils. The depth of the offsets 108 may define the distance between the top face sheet 105 and the bottom face sheet 102 creating an interstitial space 104 between the layers. The vapor may flow through the interstitial space 104 created by the offsets 108. The offsets 108 also provide structural support to maintain appropriate spacing between the top face sheet 105 and the bottom face sheet 102, thereby maintaining the vapor path. The VCS 100 may be attached to a tank or structural support 300 and a flow of cold gas 201 may be provided through the interstitial space 104 between face sheets 102, 105, thereby intercepting heat transferred to or from the structure 300. More specifically, cooled vapor may be made to flow in the direction 200 to intercept heat transferred between the structure 300 and the surrounding environment 500, the vapor then being passed out of the VCS (as indicated by arrow 202) removing heat from the system.

Figure 7:
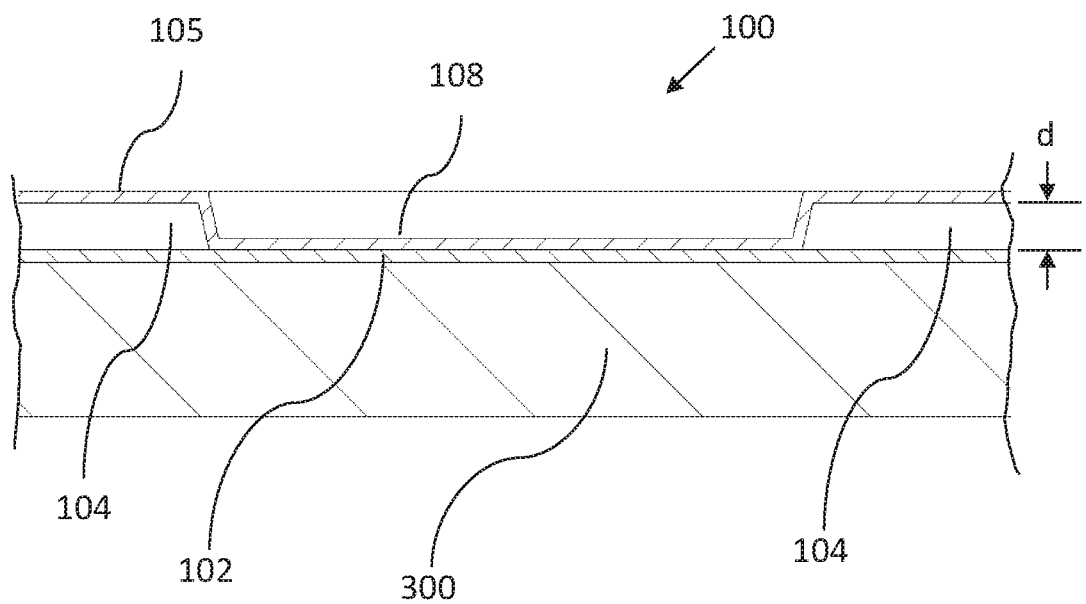
FIG. 7 illustrates a sectional view of the VCS of FIG. 6.

As illustrated in detail in FIG. 7, the top face sheet 105 is embossed with offsets 108 at distance "d" to create the interstitial space 104 between the bottom face sheet 102 and top face sheet 105. The vapor transport layer is created within dimension "d" and, in certain implementations, may range from and including 0.005 inches to and including 0.5 inches. Once formed, the VCS 100 may be attached to the underlying tank or support structure 300. To do so, the VCS panels 100 may be bonded, bolted, riveted, welded, or otherwise attached to the tank or support structure 300 to assure structural integrity and good thermal contact with the tank surface or structural support 300.

Figure 8:
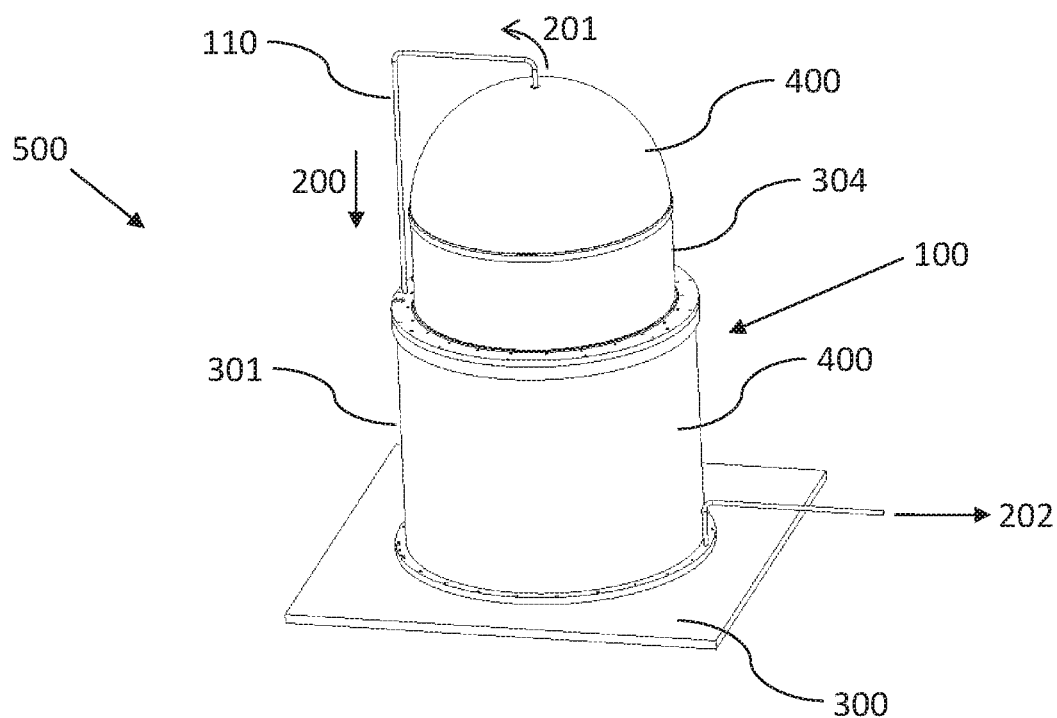
FIG. 8 illustrates an isometric view of a cryogenic tank according to the present disclosure, the cryogenic tank supported by a skirt structure that is insulated with a VCS.
Figure 9:
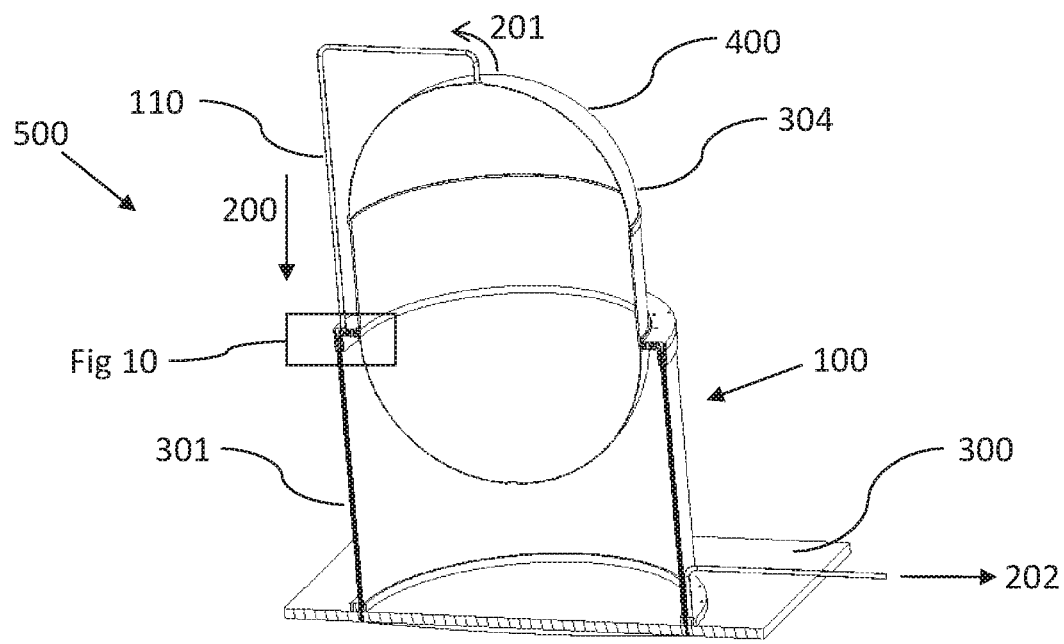
FIG. 9 illustrates an isometric cross-sectional view of the cryogenic tank of FIG. 8.

As depicted in FIG. 8 and FIG. 9, a cryogenic tank 304 is supported off of a warm boundary platform 300 by a skirt 301 to isolate thermal heat gain from the warm boundary platform 300. Skirt designs are intended to minimize the solid conduction from the warm boundary support 300 to the tank 304. The tank 304 includes insulation to minimize convective and radiative heat gain from the surrounding environment 500. In the example illustrated, the skirt 301 is insulated with a VCS 100 and possibly an additional external insulation structure 400, which not only insulates the support structure 300 from convective and radiative heat gain from the surrounding environment 500, but allows vapor cooling of the support structure 301, further reducing heat gain into the tank 304 (or similar insulated equipment). Insulation of the tank 304 and skirt 301 may be provided by the structures illustrated in FIGS. 1-7, in various examples, as well as other similar insulation structures in accordance with this disclosure. Cold boil-off vapor (indicated by arrow 201), can pass from the tank through a vapor vent line 110 in the flow direction 200. The cold vapor enters the VCS 100 and cools the support skirt 301 reducing heat gain. In certain implementations, such a reduction may be as much as 90% relative to a non-vapor cooled, non-insulated tank structure. The warmed vent gas that exits the VCS 100 may then expelled be from the system (as indicated by arrow 202), carrying heat away. The vent gas expelled from the system may be vented to the external environment 500 (e.g., to space), connected and cooled in a closed loop as discussed below, or otherwise recirculated, in various possible examples.

Figure 10:
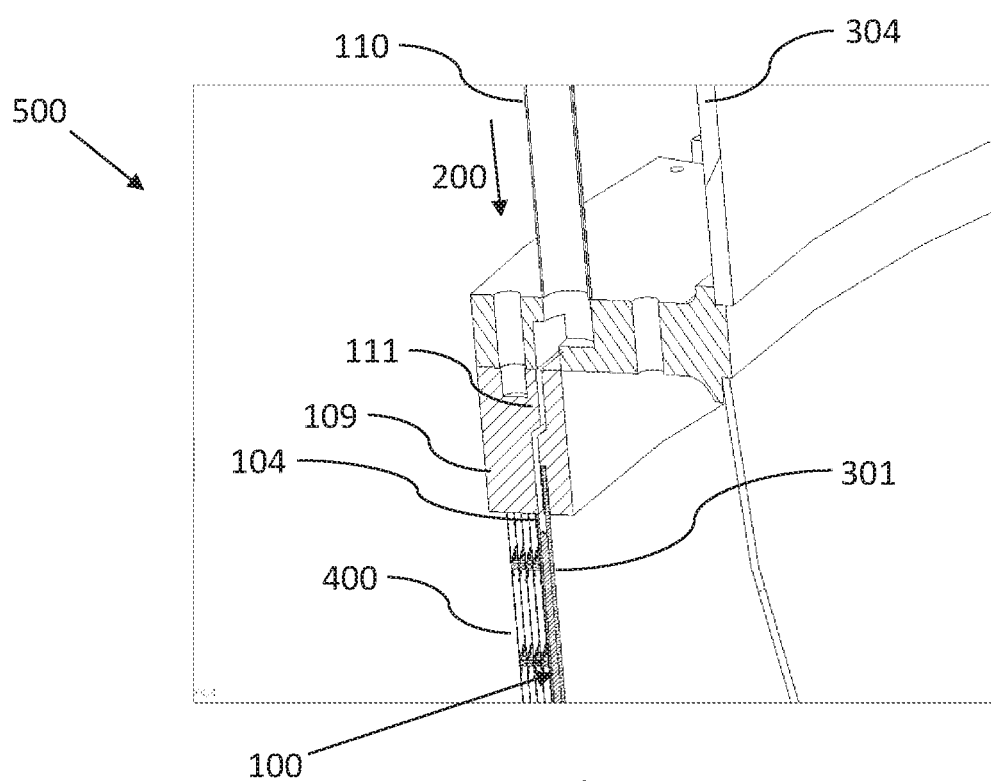
FIG. 10 illustrates an isometric cross-sectional view of a gas vent path of the cryogenic tank of FIG. 8.

As illustrated in the detailed cross-sectional view of FIG. 10, the cold boil-off vent gas from the cryogenic tank 304 is carried along the vent tube 110 in direction 200 and into the VCS 100. The cold vent gas enters into the vapor transport layer of the VCS 100 though a flow distribution network 109 and enters into the interstitial spaces 104 defined by the VCS 100, thereby cooling the entire surface of the structural support skirt 301. The VCS 100 can be insulated with additional insulation 400 to further reduce heat exchange with the surrounding environment 500. The vapor distribution network 109 may be formed of a network of tubes or pipes connecting the input line 110 to the interstitial spaces 104 and their corresponding vapor pathways. In another embodiment, a manifold may be provided that includes distribution pathways between an input port, to which the input line (or input lines) connect, and the interstitial vapor pathways. In certain implementations, the distribution network 109 may be hermetically sealed at the input line (or lines) and the VCS 100. Other structures may be used to couple the VCS 100 to the vapor input and/or the vapor output including, without limitation, formed or molded structures and combinations of the various structures discussed. In general, the distribution network 109 distributes cold vapor into the VCS 100 to flow through the VCS 100, and may provide such distribution in various ways depending on the scale of the VCS 100 and the configuration of the VCS 100. A similar distribution network may be coupled to the egress side of the VCS 100 to carry vapor from the VCS to the vent line (or lines) as the case may be.

Figure 11:
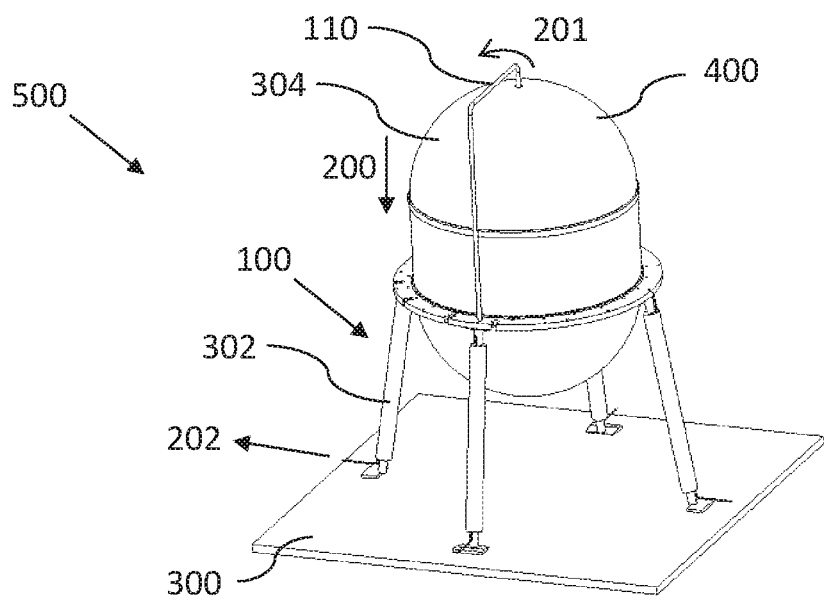
FIG. 11 illustrates an isometric view of a second cryogenic tank according to the present disclosure, the cryogenic tank supported by a series of strut members that are insulated with a VCS.

An alternative method of a tank support is depicted in FIG. 11 in which the cryogenic tank 304 is supported by a series of structural strut members 302. The struts 302 are designed to reduce solid conduction from the warm support platform 300 and unwanted heat gain from the surrounding environment 500 to the tank 304. The tank 304 may include an insulation structure 400 to minimize convective and radiative heat gain from the surrounding environment 500. A VCS 100 could also be applied to each of the support struts 302 to further reduce heat gain to the tank 304. Cold boil-off vapor may be vented from the tank 304 through a vent line 110 in direction 200 and passed into each of the VCS structures 100 on the struts 302. Cold vapor 201 may enter the VCS structures 100 intercepting heat transferred to or from the surrounding environment 500. The warmed vapor may then be passed out through one or more vent lines, such as vent line 202. The result is a substantial reduction in heat gain to the tank through the support structure by as much as 90% as compared to applications in which a VCS 100 is omitted.

Figure 12:
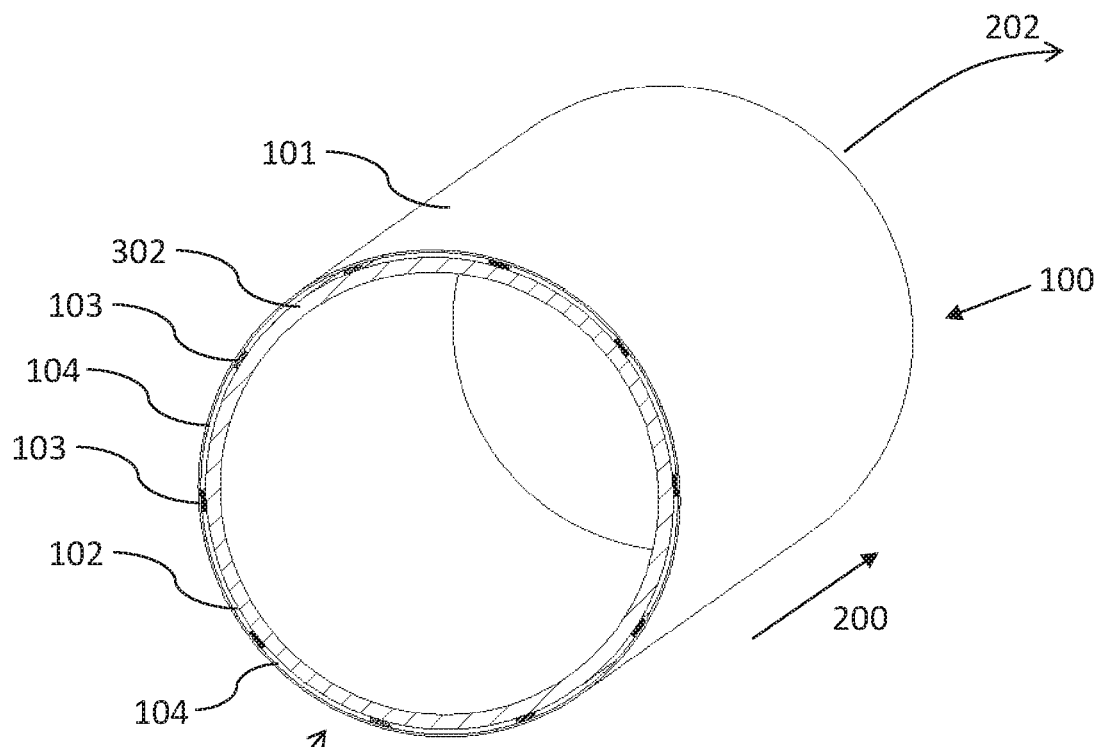
FIG. 12 illustrates a sectional view of a structural strut support member of the cryogenic tank of FIG. 11, the strut support member being surrounded by a VCS.

Illustrated in FIG. 12 is a detailed cross-sectional view a support strut 302 with a VCS 100 coupled to the support strut 302. The VCS 100 includes discrete spacers 103 adhered to a bottom face sheet 102. Alternatively, the spacers 103 could be adhered directly to the support strut 302 to reduce overall mass of the cooled support strut 302. The spacers 103 may be directly connected, through bonding or welding, to the structure 300. Alternatively the spacers 103 could be an integral feature of the support strut 302. A hermetic top face sheet 101 is adhered to the spacers 103 creating interstitial spaces 104. Cold vapor is passed through the interstitial spaces 104 (as indicated by arrow 201) to intercept heat transferred to or from the structural strut 302. Heat gained into the flowing vapor is passed out of the VCS 100 at a downstream outlet or vent (as indicated by arrow 202). In the various embodiments discussed herein, the interstitial spaces 104 define a vapor path that may be include some positive pressure, provided by the vapor flow into the interstitial spaces 104. Spacers 103, in combination with layer stiffness and positive gas pressure, may be used to provide structural integrity to maintain separation between the bottom face sheet 102 (or the strut 302 if the bottom face sheet 102 is omitted) and the top face sheet 101, thus maintaining the interstitial spaces 104 and corresponding vapor paths.

Figure 13:
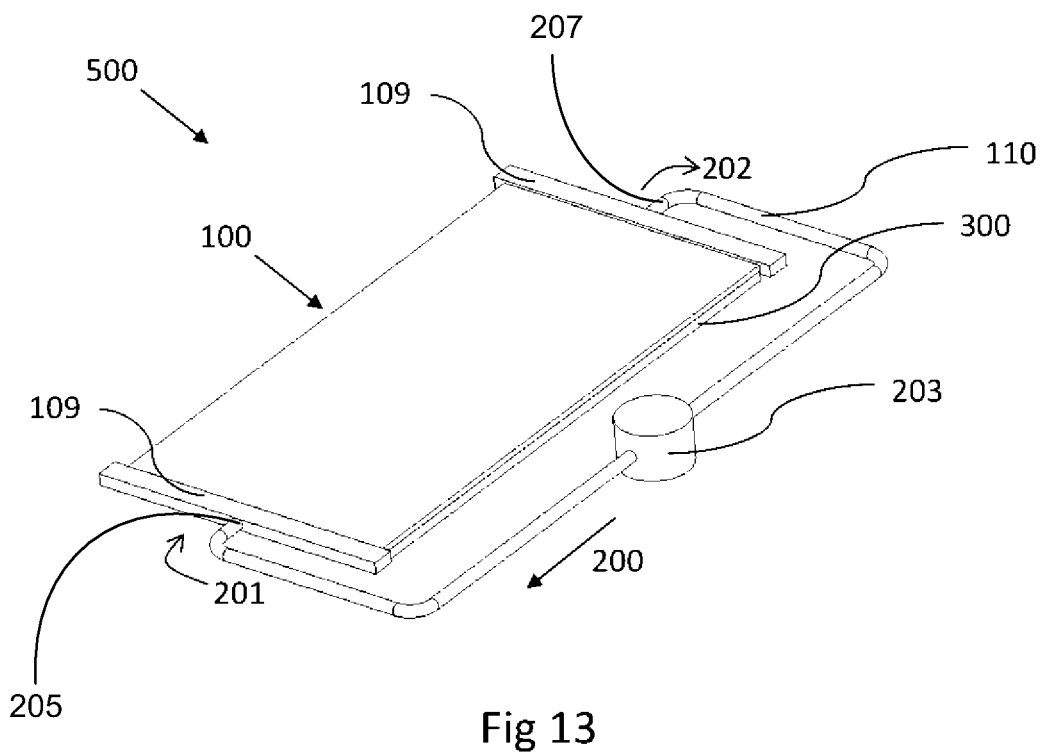
FIG. 13 illustrates an isometric view of a closed loop system according to the present disclosure for circulating a cooling gas, the closed loop system including a VCS.

A VCS may operate in a closed loop system as an alternative to the boil-off and venting application described in the context of FIGS. 8-12. For example, FIG. 13 illustrates an implementation of a VCS 100 in a closed loop configuration. In such an implementation, a closed loop heat pump, such as a compressor, a heat exchanger, or a cryocooler 203, could be used to transfer energy into and out of a closed gas or fluid loop. In such an implementation, cold gas flowing in the direction 200 enters the VCS system 100 at an inlet 205 and through a flow distribution network 109. As the gas flows through the VCS 100, heat transferred from the surrounding environment 500 into the tank or support structure 300 would be intercepted by the gas. The warmed gas 202 would then be collected through a flow distribution network 109 and fed back through a vent line 110 via an outlet 207 and to the heat pump 203.

Figure 14:
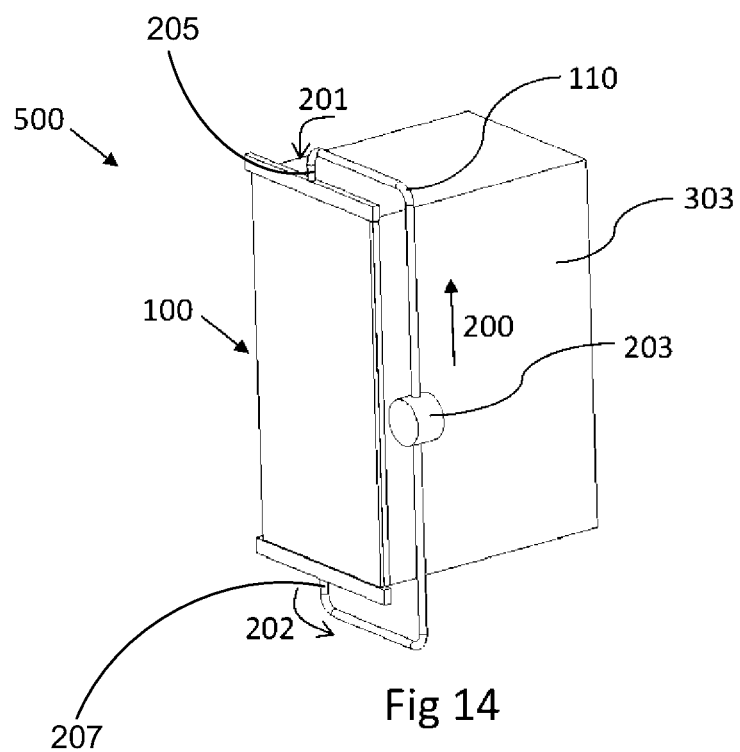
FIG. 14 illustrates an isometric view of an enclosure including the closed loop system of FIG. 13.

The closed loop system of FIG. 13 could be applied to a refrigerated enclosure as illustrated in FIG. 14. As shown in FIG. 14, a VCS 100 could be applied to one or more surfaces of an enclosure 303. The VCS 100 is intimately attached to one or more of the surfaces of the enclosure, thereby enabling interception of heat gain from the surrounding environment 500. A heat pump 203 condenses and expands a refrigerant or other gas such that cold gas flows along direction 200 and into an inlet 205 (as indicated by arrow 201) of the VCS 100. As the cold gas flows through the VCS 100, the gas intercepts heat from the surrounding environment 500, warms, and carries the heat away through an outlet 207 (as indicated by arrow 202) of the VCS 100 towards the heat pump 203. This process may be repeated, cycling heat away from the interior of the enclosure. The implementation illustrated in FIG. 14 may be particularly effective as a means of heat transfer as required by commercial or industrial refrigeration systems.

It is believed that the present disclosure and many of its attendant advantages should be understood by the foregoing description, and it should be apparent that various changes may be made in the form, construction, and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it should be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A vapor cooled insulation structure comprising:
   a first vapor non-permeable layer, the first vapor non-permeable layer comprising a vapor non-permeable face sheet, the first vapor non-permeable layer formed separately from and attachable to an outer surface of a structure such that the first vapor non-permeable layer is outward of the outside surface;
   a second vapor non-permeable layer;
   a plurality of spacers positioned between the first vapor non-permeable layer and the second vapor non-permeable layer, the spacers creating a void space between the first vapor non-permeable layer and the second vapor non-permeable layer, the plurality of spacers coupled with at least one of the first vapor non-permeable layer or the second vapor non-permeable layer; and
   a vapor inlet in fluid communication with the void space to allow vapor to enter the void space and flow through the void space between the first vapor non-permeable layer and the second vapor non-permeable layer.

2. The vapor cooled insulation structure of claim 1 wherein the second vapor non-permeable layer is an insulating sheet.

3. The vapor cooled insulation structure of claim 1 wherein the second vapor non-permeable layer is the outside surface of the structure to which the vapor cooled insulation structure is attached.

4. The vapor cooled insulation structure of claim 3 wherein the plurality of spacers is at least one of integrally formed with and coupled to the outside surface of the structure.

5. The vapor cooled insulation structure of claim 1 further comprising a vapor outlet in fluid communication with the void space to allow the vapor to exit the void space carrying away any heat captured by the vapor.

6. The vapor cooled insulation structure of claim 5 wherein the vapor inlet and the vapor outlet are interconnected in a closed loop such that vapor in the closed loop is cooled by a cooling device in closed loop.

7. The vapor cooled insulation structure of claim 1 wherein at least one of the first vapor non-permeable layer or the second vapor non-permeable layer forms a portion of a multi-layer insulation.

8. The vapor cooled insulation structure of claim 1 wherein the second vapor non-permeable layer is in direct thermal contact with a surface being cooled such that vapor passed through the void space contacts and flows over the second vapor non-permeable layer.

9. The vapor cooled insulation structure of claim 8 wherein the surface being cooled is the second vapor non-permeable layer.

10. The vapor cooled insulation structure of claim 1 wherein each of the first vapor non-permeable layer and the second vapor non-permeable layer are between layers of a multi-layer insulation.

11. The vapor cooled insulation structure of claim 1 wherein the spacers are provided by dimples in at least one of the first vapor non-permeable layer or the second vapor non-permeable layer.

12. The vapor cooled insulation structure of claim 1 wherein the first vapor non-permeable layer comprises a low emissivity material.

13. The vapor cooled insulation structure of claim 1 wherein the vapor cooled insulation structure provides structural support for an external insulation element.

14. The vapor cooled insulation structure of claim 1 wherein the first vapor non-permeable layer, the second vapor non-permeable layer, and the plurality of spacers define a plurality of vapor flow pathways extending through the void space.

15. The vapor cooled insulation structure of claim 1, wherein each of the plurality of spacers has a height from and including 0.005 inches to and including 0.5 inches and adjacent spacers of the plurality of spacers have a separation from and including 1 inch to and including 6 inches.

16. The vapor cooled insulation structure of claim 1, wherein the face sheet comprises at least one of a polymer film, a composite foil, and a metal foil.

17. A vapor cooled insulation structure comprising:
- a first vapor non-permeable layer, the first vapor non-permeable layer comprising a vapor non-permeable face sheet;
- a second vapor non-permeable layer;
- a plurality of spacers positioned between the first vapor non-permeable layer and the second vapor non-permeable layer, the spacers creating a void space between the first vapor non-permeable layer and the second vapor non-permeable layer, the plurality of spacers coupled with at least one of the first vapor non-permeable layer or the second vapor non-permeable layer, the first vapor non-permeable layer, the second vapor non-permeable layer, and the plurality of spacers defining a plurality of vapor flow pathways extending through the void space;
- a vapor inlet in fluid communication with the void space to allow vapor to enter the void space and flow through the void space between the first vapor non-permeable layer and the second vapor non-permeable layer; and
- a distribution structure disposed between the vapor inlet and the void space, the distribution structure defining a plurality of vapor distribution pathways, each of the vapor distribution pathways extending from the vapor inlet to a respective vapor flow pathway of the plurality of vapor flow pathways.

18. An insulation structure comprising:
- a first vapor non-permeable layer, the first vapor non-permeable layer comprising a vapor non-permeable face sheet, the first vapor non-permeable layer attachable to an outer surface of a structure such that the first vapor non-permeable layer is outward of the outside surface;
- a second vapor non-permeable layer;
- a plurality of spacers positioned between the first vapor non-permeable layer and the second vapor non-permeable layer, the spacers creating a void space between the first vapor non-permeable layer and the vapor second non-permeable layer, the plurality of spacers coupled with at least one of the first vapor non-permeable layer or the second vapor non-permeable layer;
- a vapor inlet in fluid communication with the void space to allow vapor to enter the void space and flow through the void space between the first vapor non-permeable layer and the second vapor non-permeable layer; and
- a first multi-layer insulation structure coupled to the first vapor non-permeable layer.

19. The insulation structure of claim 18 further comprising a second multi-layer insulation structure coupled to the second vapor non-permeable layer such that the first vapor non-permeable layer and the second vapor non-permeable layer define a vapor transport layer disposed between the first multi-layer insulation structure and the second multi-layer insulation structure.

20. The insulation structure of claim 18, wherein the second vapor non-permeable layer is one of a surface of a structure to be cooled and an insulating sheet.

* * * * *